US009485299B2

(12) United States Patent
Myers

(10) Patent No.: US 9,485,299 B2
(45) Date of Patent: Nov. 1, 2016

(54) PROGRESSIVE DOWNLOAD GATEWAY

(75) Inventor: Robert Linwood Myers, Mississauga (CA)

(73) Assignee: ARRIS Canada, Inc., Suwanee, GA (US)

(*) Notice: Subject to any disclaimer, the term of this patent is extended or adjusted under 35 U.S.C. 154(b) by 74 days.

(21) Appl. No.: 12/400,306

(22) Filed: Mar. 9, 2009

(65) Prior Publication Data
US 2010/0228875 A1    Sep. 9, 2010

(51) Int. Cl.
G06F 15/16 (2006.01)
H04L 29/08 (2006.01)
H04L 29/06 (2006.01)

(52) U.S. Cl.
CPC ........... *H04L 67/06* (2013.01); *H04L 65/1089* (2013.01); *H04L 65/608* (2013.01); *H04L 67/02* (2013.01); *H04L 67/28* (2013.01); *H04L 67/2814* (2013.01); *H04L 67/2828* (2013.01)

(58) Field of Classification Search
CPC .. H04L 65/608; H04L 67/2814; H04L 67/02
USPC ........................................ 709/231, 230, 232
See application file for complete search history.

(56) References Cited

U.S. PATENT DOCUMENTS

| 5,920,865 A | 7/1999 | Ariga |
| 5,978,843 A | 11/1999 | Wu et al. |
| 6,240,243 B1 | 5/2001 | Chen et al. |
| 6,279,040 B1 | 8/2001 | Ma et al. |
| 6,529,996 B1 | 3/2003 | Nguyen et al. |
| 7,028,096 B1 | 4/2006 | Lee |
| 7,095,782 B1 | 8/2006 | Cohen et al. |
| 7,143,170 B2 | 11/2006 | Swildens et al. |
| 7,194,000 B2 | 3/2007 | Balachandran et al. |
| 7,359,985 B2 | 4/2008 | Grove et al. |
| 7,369,610 B2 | 5/2008 | Xu et al. |
| 7,376,716 B2 | 5/2008 | Dilley et al. |

(Continued)

FOREIGN PATENT DOCUMENTS

EP    1122654 A2    8/2001

OTHER PUBLICATIONS

Co-pending U.S. Appl. No. 12/400,270, "Multi-Tiered Scalable Media Streaming Systems and Methods", filed Mar. 9, 2009.

(Continued)

*Primary Examiner* — Tonia L Dollinger
*Assistant Examiner* — Adam Cooney
(74) *Attorney, Agent, or Firm* — Stewart M. Wiener

(57) ABSTRACT

Embodiments disclosed herein relate to a gateway for delivering scalable media files from a web server to a client in a manner that allows dynamic thinning. The gateway includes a control module for receiving a request for a scalable media file, forwarding the request to a web server, receiving the scalable media file from the web server using a first protocol, transmitting a redirect message to the client, and receiving a streaming request from the client in response; a packet processor for packetizing the scalable media file to produce raw scalable media packets; an encapsulation module for encapsulating the raw scalable media packets using a second protocol to produce encapsulated scalable media packets; and an output module for streaming the encapsulated scalable media packets to the client in response to the streaming request. The gateway may also include a module for thinning the raw scalable media packets prior to encapsulation.

34 Claims, 4 Drawing Sheets

(56) References Cited

U.S. PATENT DOCUMENTS

| | | | |
|---|---|---|---|
| 7,392,325 B2 | 6/2008 | Grove et al. | |
| 7,446,774 B1 | 11/2008 | MacInnis et al. | |
| 7,536,469 B2 | 5/2009 | Chou et al. | |
| 7,536,470 B2 | 5/2009 | Li et al. | |
| 7,543,073 B2 | 6/2009 | Chou et al. | |
| 7,734,730 B2* | 6/2010 | McCanne | 709/219 |
| 7,930,449 B2 | 4/2011 | Tinsman et al. | |
| 7,991,049 B2 | 8/2011 | MacInnis et al. | |
| 8,065,426 B2 | 11/2011 | Edelman et al. | |
| 8,156,246 B2* | 4/2012 | Short et al. | 709/239 |
| 8,161,021 B2 | 4/2012 | Hirabayashi et al. | |
| 8,184,142 B2 | 5/2012 | Harel et al. | |
| 8,190,677 B2 | 5/2012 | Myers et al. | |
| 8,213,769 B2 | 7/2012 | Fu et al. | |
| 8,218,628 B2 | 7/2012 | Schwarz et al. | |
| 8,228,363 B2 | 7/2012 | Halavy | |
| 8,301,696 B2 | 10/2012 | Myers et al. | |
| 2002/0021761 A1 | 2/2002 | Zhang et al. | |
| 2002/0140851 A1 | 10/2002 | Laksono | |
| 2003/0195977 A1 | 10/2003 | Liu et al. | |
| 2004/0202320 A1 | 10/2004 | Amini et al. | |
| 2005/0031308 A1 | 2/2005 | Fu et al. | |
| 2005/0163224 A1 | 7/2005 | Shin et al. | |
| 2006/0083308 A1 | 4/2006 | Schwarz et al. | |
| 2006/0083309 A1 | 4/2006 | Schwarz et al. | |
| 2006/0143678 A1 | 6/2006 | Chou et al. | |
| 2006/0165166 A1 | 7/2006 | Chou et al. | |
| 2006/0248216 A1* | 11/2006 | Park | 709/231 |
| 2007/0022215 A1 | 1/2007 | Singer et al. | |
| 2007/0036218 A1 | 2/2007 | Burazerovic | |
| 2007/0118618 A1* | 5/2007 | Kisel et al. | 709/219 |
| 2007/0121723 A1 | 5/2007 | Mathew et al. | |
| 2007/0165524 A1 | 7/2007 | Mascolo | |
| 2007/0201549 A1 | 8/2007 | Hannuksela et al. | |
| 2007/0263087 A1 | 11/2007 | Hong et al. | |
| 2007/0268362 A1 | 11/2007 | West et al. | |
| 2007/0276954 A1 | 11/2007 | Chan et al. | |
| 2007/0291837 A1* | 12/2007 | Eleftheriadis | 375/240.02 |
| 2008/0037656 A1 | 2/2008 | Hannuksela | |
| 2008/0095230 A1 | 4/2008 | Hannuksela et al. | |
| 2008/0120424 A1 | 5/2008 | Deshpande | |
| 2008/0130658 A1 | 6/2008 | Chakareski et al. | |
| 2008/0211901 A1 | 9/2008 | Civanlar et al. | |
| 2008/0239062 A1 | 10/2008 | Civanlar et al. | |
| 2008/0247460 A1 | 10/2008 | Kang et al. | |
| 2009/0013083 A9 | 1/2009 | Garcia-Luna-Aceves et al. | |
| 2009/0016434 A1 | 1/2009 | Amonou et al. | |
| 2009/0031021 A1 | 1/2009 | Bae et al. | |
| 2009/0119594 A1 | 5/2009 | Hannuksela | |
| 2009/0178091 A1* | 7/2009 | Miyamoto et al. | 725/91 |
| 2009/0295988 A1 | 12/2009 | Kohno | |
| 2010/0080285 A1 | 4/2010 | Lee et al. | |
| 2010/0111183 A1 | 5/2010 | Jeon et al. | |
| 2010/0125629 A1 | 5/2010 | Serenyi et al. | |
| 2010/0189182 A1 | 7/2010 | Hannuksela | |
| 2010/0228862 A1 | 9/2010 | Myers | |
| 2010/0228880 A1 | 9/2010 | Hunt et al. | |
| 2010/0266042 A1 | 10/2010 | Koo et al. | |
| 2010/0268836 A1 | 10/2010 | Jabri et al. | |
| 2010/0296000 A1 | 11/2010 | Henocq et al. | |
| 2010/0316136 A1 | 12/2010 | Jeon et al. | |
| 2010/0316360 A1 | 12/2010 | Jeon et al. | |
| 2010/0316361 A1 | 12/2010 | Jeon et al. | |
| 2010/0316362 A1 | 12/2010 | Jeon et al. | |
| 2011/0013538 A1 | 1/2011 | Henocq et al. | |
| 2011/0038421 A1 | 2/2011 | Schwarz et al. | |
| 2011/0064146 A1 | 3/2011 | Chen et al. | |
| 2011/0082945 A1 | 4/2011 | Myers et al. | |
| 2011/0087794 A1 | 4/2011 | Li et al. | |
| 2011/0096828 A1 | 4/2011 | Chen et al. | |
| 2011/0173345 A1 | 7/2011 | Knox et al. | |
| 2012/0011267 A1 | 1/2012 | Ma et al. | |
| 2012/0023155 A1 | 1/2012 | Myers et al. | |
| 2012/0023352 A1 | 1/2012 | Cumming et al. | |
| 2012/0027083 A1 | 2/2012 | Narroschke et al. | |
| 2012/0321082 A1 | 12/2012 | Fu et al. | |

OTHER PUBLICATIONS

Jens-Rainer Ohm, "Scalable Video Coding", In: Shenzhen Workshop, RWTH Aachen University, Oct. 2007, Aachen, Germany.

Heiko Schwarz et al., "Overview of the Scalable Video Coding Extension of the H.264/AVC Standard", In: IEEE Transactions on Circuits and Systems for Video Technology, Sep. 2007, vol. 17, No. 9, Berlin, Germany.

ISO/IEC 14496-15:2004 Amd 2:2008, "Information technology—Coding of audio-visual objects—Part 15: Advanced Video Coding (AVC) file format".

Co-pending U.S. Appl. No. 12/842,515, "Methods and Systems for Scalable Video Delivery", filed Jul. 23, 2010.

United States Office Action, U.S. Appl. No. 12/400,270, dated Nov. 23, 2010.

United States Office Action Response, U.S. Appl. No. 12/400,270, dated Feb. 17, 2011.

United States Office Action, U.S. Appl. No. 12/400,270, dated Apr. 28, 2011.

Co-pending U.S. Appl. No. 12/842,474, "Methods and Systems for Scalable Video Chunking", filed Jul. 23, 2010.

ISO/IEC 14496-12:Third Edition Oct. 15, 2008, "Information technology—Coding of audio-visual objects—Part 12: ISO base media file format".

U.S. Notice of Allowance dated Mar. 5, 2012, U.S. Appl. No. 12/842,515.

Extended European Search Report dated Nov. 9, 2011 for Application No. 11174626.9-1247.

Thomas Schierl et al. "Response to CfP on HTTP Streaming of MPEG Media—On Adaptive HTTP Streaming using SVC and MVC", 93. MPEG Meeting; Jul. 26, 2010-Jul. 30, 2010; Geneva; (Motion Picture Expert Group or ISO/IEC JTC/SC29/WG11) No. M17851, Jul. 22, 2010.

Universal Mobile Telecommunications System (UMTS); LTD; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route des Lucioles; F06921 Sophia-Antipolis; France, vol. 3GPP SA 4, No. V9.3.0 Jun. 1, 2010, XP014047290, section 12.1, section 12.6.2, p. 109, examples 15 and 16.

Anonymous: "Study of ISO/IEC 14496-10: 2009/DCOR 1", 90. MPEG Meeting; Oct. 26, 2009-Oct. 30, 2009; Xian; (Motion Picture Expert Group or ISO/IEC JTC1/SC29/WG11) No. N10898, Nov. 18, 2009 XP030017397.

Wenger M M Hannuksela T Stockhammer M Westerlund D Singer S: "RTP Payload Format for H.264 Video; rfc3984.txt", 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11AND ITU-T SG. 16); URL: http://wftp3.itu.int/av-arch/jc tvc-site/, Internet Engineering Task Force, IETF, CH, Feb. 1, 2005, XP015009755, ISSN: 0000-0003, section 5.5.

Microsoft Corporation: "IIS Smooth Streaming Transport Protocol", Internet Citation, Sep. 8, 2009, pp. 1-55, XP002617721, Retrieved from the Internet: URL: http://www.iis.net/community/files/media/smoothspecs/%5BMS-SMTH%5D.pdf [retrieved on Jan. 21, 2011] section 1.3, section 4.

Alex Zambelli: "IIS Smooth Streaming Technical Overview", Mar. 31, 2009, XP55009366, Retrieved from the Internet: URL: http://img.prodek.lt/documents/IIS_Smooth_Streaming_Technical_Overview; pdf [retrieved on Oct. 12, 2011] the whole document.

Hypertext Transfer Protocol—HTTP/1.1, section 10.3, Internet RFC 2616, Retrieved from the internet: URL: <http://www.w3.org/Protocols/rfc2616/rfc2616.html> [retrieved on Apr. 1, 2012].

"Use Standard Redirects—Don't Break the Back Button!", W3C, Retrieved from the Internet: URL: <http://www.w3.org/QA/Tips/reback> [retrieved on Apr. 1, 2012].

(56) References Cited

OTHER PUBLICATIONS

United States Office Action Response and RCE, U.S. Appl. No. 12/400,270, dated Jul. 8, 2011.
Co-pending U.S. Appl. No. 13/445,285 "Methods and Systems for Scalable Video Delivery", filed Apr. 12, 2012.
Response dated Jul. 9, 2012, U.S. Appl. No. 12/842,474.
Office Action dated Jun. 19, 2012, U.S. Appl. No. 12/842,474.
Response and Terminal Disclaimer dated Jul. 18, 2012, U.S. Appl. No. 13/445,285.
Office Action dated Jun. 5, 2012, U.S. Appl. No. 13/445,285.
Co-pending U.S. Appl. No. 13/445,361 "Methods and Systems for Real-Time Transmuxing of Streaming Media Content", filed Apr. 12, 2012.
Notice of Allowance dated Aug. 7, 2012, U.S. Appl. No. 13/445,285.
Document relating to U.S. Appl. No. 12/400,270, dated Sep. 17, 2013 (Office Action Response).
Document relating to U.S. Appl. No. 12/400,270, dated Jun. 17, 2013 (Office Action).
Documents relating to U.S. Appl. No. 12/842,474, now allowed (Prosecution History).
Official Action, Re: Canadian Application No. 2,657,426, dated May 5, 2016.

* cited by examiner

PROGRESSIVE DOWNLOAD GATEWAY

FIELD

The described embodiments relate to the field of progressive download, and in particular to progressive download of scalable media, such as video and audio.

BACKGROUND

Digital media files such as video and audio are typically delivered over a network using one of two methods: streaming or download. Streaming media involves sending portions of a media file from a media server to a media client and playing the received portions as they are received. With streaming media, the user does not have to wait to download a large file before seeing the video or hearing the audio. Instead, the media is sent in a continuous stream and is played as it arrives.

In streaming, the media server typically opens a conversation with the media client. The conversation usually has two parts: one part is for control messages between the media client and the media server; and the other part is for transferring the media (e.g. video) from the media server to the media client. Because the media server and the media client continue to exchange control messages, the media server can adjust to changing networks conditions as the media is played. The control messages also typically include user actions like play, pause, stop, and seeking to a particular part of the file.

Most modern media transmission systems use RTP (Real-time Transfer Protocol)/RTSP (Real Time Streaming Protocol) for streaming. RTSP is a protocol for use in streaming media, which allows a client to remotely control a streaming media server, issuing VCR-like commands such as "play" and "pause", and allowing time-based access to files on a media server. The sending of streaming data itself is not part of the RTSP protocol. Most RTSP systems use RTP as the transport for the actual audio/video data.

Unlike streaming, the download method involves transferring the entire media file from a web server (HTTP server) to the media client. Historically, the download method required that the media client had to wait until the entire file was downloaded before it could start playing the media file. More recent solutions, however, allow a media client to start playing the media file once a portion of it has been downloaded; this is referred to as progressive download. Progressive download provides a better end user experience over the traditional download, as the media client can start playing the media file as soon as it receives enough of the file to begin the decoding and displaying functions.

Recently, a new video coding standard, referred to as Scalable Video Coding (SVC) was developed. SVC is an extension of the H.264/MPEG-4 AVC video compression standard. When a video file is SVC encoded, it is encoded into one or more layers, of differing quality. The layer with the lowest quality, referred to as the base layer, contains the most important part of the video stream. One or more enhancement layers may then be encoded to further refine the quality of the base layer. The enhancement layers are used for improving the spatial resolution (picture size), temporal resolution (frame rate), and the SNR (signal to noise ratio) quality of the base layer.

An SVC encoded video stream is organized into NAL (Network Abstraction Layer) units. The NAL unit headers identify which SVC layer the unit belongs to. The NAL unit header information can be used to strategically drop layers of the stream. The process of strategically dropping packets is referred to as thinning. Thinning allows media streams to be tailored to the media client by delivering media streams with different resolutions, frame rates and quality to different media clients. Thinning has the effect of changing the bandwidth requirements of a media stream.

A network element, such as a media-aware network element (MANE), can be inserted in the network between a media server and a media client to dynamically thin an SVC-encoded video stream according to the media client capabilities and the network characteristics thereby achieving efficient use of available bandwidths.

However, a standard network element, such as a MANE, cannot be used to dynamically thin a progressive download. This is due to the way that media files are stored and transmitted from a web server. Specifically, media files (scalable or otherwise) are typically stored on a web server in a media container format. A media container format is a computer file format that can contain several types of data (such as audio and video) compressed by means of standardized audio/video codecs. The container file is used to identify and interleave the different data types. The structure of these formats is such that they are based on defined lengths of data. The data length is generated when the file is encoded/created and then embedded within the file itself in a multi-byte length field. When an application reads the file it uses the length field to parse the file into its multiple fields.

When a web server receives a progressive download request (e.g. a "HTTP get" request"), the web sever reads the file from the start, breaks it up into appropriate size packets and encapsulates it using a standard protocol (i.e. HTTP) and transmits it to the media client.

If a network element (i.e. a MANE) were to perform thinning on the HTTP packets as they passed through the network element, it would be manipulating the content of the packets, thus changing the length of the file. Accordingly, the network element would have to modify the associated length field for the requesting media client to be able to correctly interpret the file according to current container format definitions. However, the length field is transmitted before the actual media content, therefore the network element would not be able to accurately change the length field before it is forwarded to the media client. Specifically, at the time the network element receives the length field, it does not know the ultimate length of the file.

Accordingly, there is a need for a method and system for dynamically thinning a progressive download between a web server and a media client.

SUMMARY

Embodiments disclosed herein relate generally to gateways and methods for using such gateways for delivering scalable media files from a web server to a media client so that the scalable media file can be dynamically thinned as it is being delivered.

In one broad aspect, there is provided gateway for delivering a scalable media file from a web server to a media client, the gateway comprising: (a) a control module for: (i) receiving a progressive download request from the media client for the scalable media file; (ii) forwarding the request to the web server; (iii) receiving the scalable media file from the web server in response to the progressive download request, the scalable media file being encapsulated using a first protocol; (iv) transmitting a redirect message to the media client; and (v) receiving a streaming request from the media client in response to the redirect message; and (b) a buffer module for storing the scalable media file; (c) a packet processor module for reading the scalable media file from the buffer module and packetizing the scalable media file to produce a plurality of raw scalable media packets; (d) an encapsulation module for encapsulating a plurality of processed scalable media packets using a second protocol to produce a plurality of encapsulated scalable media packets, the plurality of processed scalable media packets being at least a portion of the plurality of raw scalable media packets; and (e) an output module for streaming a plurality of output scalable media packets to the media client upon receiving the streaming request, the output scalable media packets being at least a portion of the plurality of encapsulated scalable media packets.

In another broad aspect, there is provided a method for delivering a scalable media file from a web server to a media client, the method comprising: (a) receiving a progressive download request from the media client for the scalable media file; (b) forwarding the request to the web server; (c) receiving the scalable media file from the web server in response to the progressive download request, the scalable media file being encapsulated using a first protocol; (d) transmitting a redirect message to the media client; (e) performing packetization on the scalable media file to produce a plurality of raw media packets; (f) encapsulating a plurality of processed scalable media packets using a second protocol to produce a plurality of encapsulated scalable media packets, the processed media packets comprising at least a portion of the raw scalable media packets; and (g) streaming a plurality of output scalable media packets to the media client upon receiving a streaming request from the media client, the output scalable media packets being at least a portion of the plurality of encapsulated scalable media packets.

Further aspects and advantages of the embodiments described herein will appear from the following description taken together with the accompanying drawings.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

Figure 1:
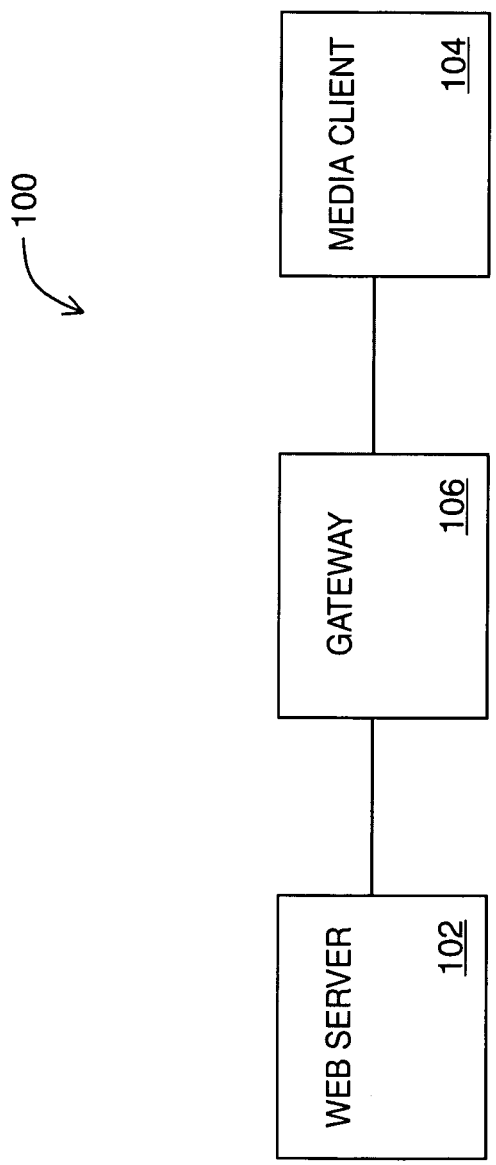
FIG. 1 is a block diagram of a system for delivering a scalable media file from a web server to a media client in accordance with at least one embodiment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems, devices and methods described herein may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device. For example and without limitation, the programmable computers may be a personal computer or laptop. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Furthermore, the systems, devices and methods of the described embodiments are capable of being distributed in a computer program product comprising a physical computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Reference is now made to FIG. 1, in which a system 100 for delivering a scalable media file from a web server 102 to a media client 104 in accordance with an embodiment is illustrated. The system 100 includes the web server 102, the media client 104 and a gateway 106. While the gateway 106 is shown in FIG. 1 connected to a single web server 102 and a single media client 104, a single gateway 106 may service multiple web servers 102 and/or multiple media clients 104.

The web server 102 holds one or more scalable media files that may be transferred to the media client 104 upon receiving a progressive download request (i.e. an "HTTP get" request). The one or more scalable media files may be scalable video files encoded using SVC, or any other scalable media files such as scalable audio files, and scalable video files encoded using any other standard. A media file is considered to be scalable when the parts of the file can be removed in a way that the resulting sub-file forms another valid media file for a receiving device, and the sub-file is a lower quality representation of the original media content than that of the complete media file. Non-scalable media files are often referred to as single-layer media files.

The scalable media files are typically stored on the web server 102 in a media container format. A media container format is a computer file format that can contain several types of data (such as audio and video) compressed by means of standardized audio/video codecs. The container file is used to identify and interleave the different data types. The structure of these formats is such that they are based on defined lengths of data. The data length is generated when the file is encoded/created and then embedded within the file itself in a multi-byte length field. When an application reads the file it uses the length field to parse the file into its multiple fields.

The web server 102, receives progressive download requests (e.g. "HTTP get" requests) from the media client 104 for scalable media files. If the web server 102 has access to the requested scalable media file, the web server 102 reads the file from the start, breaks it up into appropriate size packets, encapsulates it using a standard protocol (i.e. HTTP) and transmits it to the media client 104. The web server 102 may be implemented by the use of one or more general purpose computers, such as, for example, a Sun Microsystems™ F15K server.

The media client 104 typically includes a web browser and a media player. A web browser is a software application which enables a user to display and interact with text, images, video, music, game and other information located on a Web page at a website on the Internet or on a local network (e.g. a local area network (LAN)). The web browser interacts with the web server 102 to download specific media content, such as video and audio. The web browser may be any well known web browser such as Internet Explorer™, Mozilla Firefox™, Safari™ or the like.

A media player is software for playing back media files. Most media players support an array of media formats, including both audio and video files. The media player is typically integrated with the web browser to play or display any downloaded or streamed media files. The media player may be any well known media player such as Windows Media Player™ or Quicktime™.

The media client 104 may be implemented by the use of one or more general purpose computers, such as, for example, a typical personal computer manufactured by Dell™, Gateway™, or Hewlett-Packard™. Those skilled in the art will understand that the media client 104 may be a game console, a portable gaming device, a laptop computer, a personal digital assistant (PDA), a mobile phone, a set top box, or an interactive television.

The gateway 106 acts a protocol converter between the web server 102 and the media client 104. More specifically, the scalable media file is downloaded from the web server 102 to the gateway 106 using a first protocol or a first protocol set. The gateway 106 then converts the scalable media file into a scalable media stream and delivers the scalable media stream to the media client 104 using a second protocol or a second protocol set. By converting the scalable media file into a scalable media stream, the gateway 106 can perform stream management on the scalable media stream to take advantage of the scalable properties of the scalable media file. Stream management may include thinning and policing of the stream. Thinning and policing will be described in further detail in reference to FIG. 2.

In some embodiments, the first protocol is HTTP (Hypertext Transfer Protocol) and the second protocol set includes RTSP and RTP. Specifically, the gateway 106 downloads the scalable media file from the web server 102 using HTTP, and converts it to a real time RTP stream which is delivered to the media client 104.

In these embodiments, if the media client 104 wishes to download a particular scalable media file, the media client 104 will typically use the URL (Uniform Resource Locator) of the scalable media file to make a DNS (Domain Name) query to a DNS server (not shown). In response to the query, the DNS server sends the media client 104 one or more IP addresses corresponding to a gateway 106. Once the media client 104 has received at least one IP address, the media client 104 establishes a TCP/HTTP session with the corresponding gateway 106, generates an "HTTP get" request, and then transmits the "HTTP get" request to the gateway 106.

Upon receiving the "HTTP get" request, the gateway 106 modifies the request so that the request looks like it originated from the gateway 106. Typically this involves replacing the source IP address and source port information with the gateway 106 IP address and source port. Once the request has been modified, the gateway 106 transmits the modified request to the appropriate media server 102.

Upon receiving the modified request, the media server 102 generates a response message, such as an "HTTP ok" message or an "HTTP not found" message, that indicates whether the media server 102 has access to the requested scalable media file. The media server 102 then sends the response to the gateway 106.

If the response message indicates that the media server 102 has access to the particular scalable media file then the gateway 106 generates an HTTP re-direct message and sends it to the media client 104. The HTTP re-direct message may include an RTSP URL which will notify the media client to initiate an RTSP session with the gateway 106. The HTTP re-direct message may also include a session identifier generated by the gateway 106. The session identifier uniquely identifies the particular HTTP request and allows the gateway 106 to link the subsequent RTSP request with the initial HTTP request.

At this point, the gateway 106 receives the scalable media file from the web server 102 via HTTP and converts the received file into a scalable media stream which is transported to the client via RTP. Prior to transmitting the scalable media stream to the media client 104 the gateway 106 may perform stream management, such as thinning and policing, on the scalable media stream.

The gateway 106 will be described in further detail in reference to FIG. 2.

Figure 2:
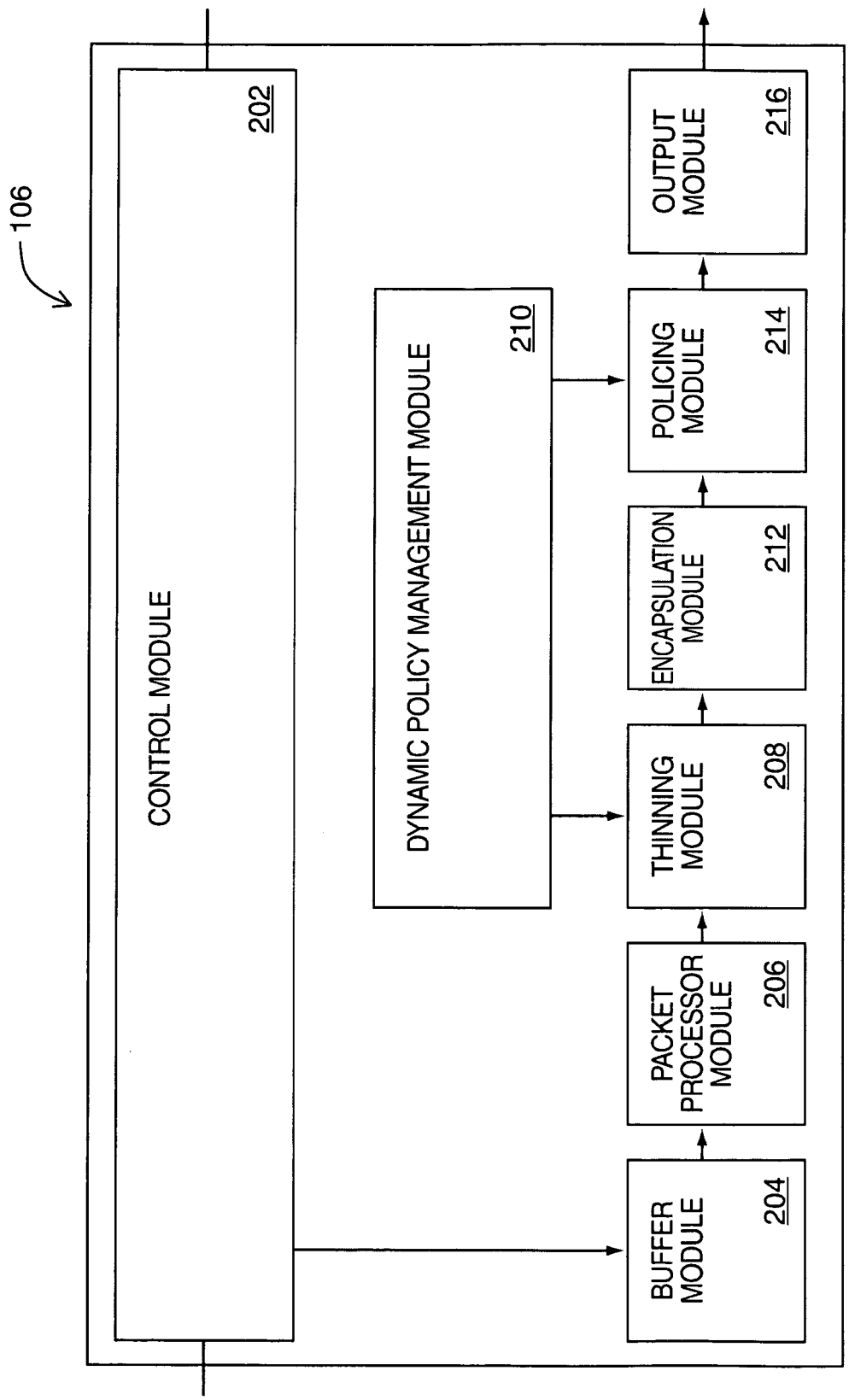
FIG. 2 is a block diagram of the gateway of FIG. 1 in accordance with at least one embodiment.

Reference is now made to FIG. 2, in which an exemplary embodiment of the gateway 106 of FIG. 1 is illustrated. In this embodiment, the gateway 106 includes a control module 202, a buffer module 204, a packet processor module 206, a thinning module 208, a dynamic policy management module 210, an encapsulation module 212, a policing module 214 and an output module 216. In other embodiments, the gateway 106 may not include the thinning module 208, the dynamic policy management module 210, and/or the policing module 214.

The control module 202 manages or controls the communication sessions between the gateway 106 and the media client 104, and between the gateway 106 and the web server 102. Specifically, the control module 202 receives progressive download requests from the media client 104 for a particular scalable media file. Each progressive download request typically includes scalable media file identification information that identifies the desired scalable media file. In some cases the initial progressive download request is an "HTTP get" request that includes the URL of the desired scalable media file.

Upon receiving a progressive download request, the control module 202 typically performs four functions. First, the control module 202 parses the progressive download request to determine the scalable media file identification information (i.e. the URL of the scalable media file).

Second, the control module 202 determines the address (e.g. IP address) of the appropriate media server 102 for the requested scalable media file based on the scalable media file identification information. This may include performing a DNS (Domain Name System) lookup of the scalable media file URL.

Third, the control module 202 creates a session record which records information about the session between the media client 104, gateway 106, and web server 102. The session record ensures that when the web server 102 starts sending the scalable media file, the subsequent scalable media stream packets (i.e. RTP packets) generated by the gateway 106 will be forwarded to the appropriate media client 104.

In these embodiments, there are typically two sub-sessions that make up the complete session. There is a first protocol (i.e. HTTP) session between the gateway 106 and the web server 102, and a second protocol (i.e. RTP/RTSP) session between the gateway 106 and the media client 104. The session record typically contains all of the information required by the gateway 106 to link packets to a particular session. Specifically, packets that are received at the gateway 106 can be associated to a specific session based on information within the packet such as source IP address (i.e. the IP address of the media client 104 or the web server 102) and TCP (Transmission Control Protocol) and UDP (User Datagram Protocol) destination ports.

Initially, the session record may include a unique session ID, the IP address of the media client 104, and the IP address of the web server 102. However, as the second protocol (i.e. RTP/RTSP) session is created, more information is added to the session record. Specifically, when the media client 104 wants to start a second protocol (i.e. RTP/RTSP) session, it first creates a TCP connection to a well known port on the gateway 106 and provides a TCP port for itself. Then during the exchange of RTSP Setup and OK messages both the media client 104 and the gateway 106 exchange UDP port information for RTP and RTCP. Accordingly, the following may be added to the session record: the media client 104 TCP port, the media client 104 RTP port, the media client 104 RTCP port, the gateway 106 RTP port, and the gateway 106 RTCP port.

The session record may be stored in a memory table or a database.

Once the control module 202 has created a session record, the control module 202 modifies the initial progressive download request, and forwards the modified progressive download request to the appropriate web server 102. Typically, the control module 202 only modifies the portions of the request that identify the media client 104 as the source or requester. For example, where the initial request is an "HTTP get" request, the control module 202 will modify the source IP address and the source port fields to reflect the IP address and port of the gateway 106. These modifications ensure that any response generated by the web server 102 will be sent back to the gateway 106 instead of to the media client 104.

The control module 202 will typically receive a response message from the web server 102 in reply to the progressive download request. The response message indicates whether the web server 102 has access to the requested scalable media file. For example, where the progressive download request is an "HTTP get" message, the web server 102 may respond with an "HTTP ok" message or an "HTTP not found" message. An "HTTP ok" message typically indicates that the web server 102 has located the requested scalable media file, whereas an "HTTP not found" message typically indicates that the web server 102 was unable to locate the scalable media file.

If the response message indicates that the web server 102 is unable to locate, or does not have access to the requested scalable media file then the control module 202 forwards the response message to the media client 104 and deletes the associated session record.

If the response message indicates that the web server 102 is able to locate and has access to the requested scalable media file then the control module 202 generates a redirect message and forwards the redirect message to the media client 104. The redirect message tells the media client 104 to change their request from a first protocol progressive download request, to a second protocol streaming request. For example, the media client 104 may have sent an initial HTTP progressive download request. The redirect message may tell the media client 104 to change their request to an RTSP streaming request.

The redirect message typically includes (i) gateway identification information; and (ii) the session identifier described above. The gateway identification information uniquely identifies the gateway 106 to allow the media client 104 to send the streaming request directly to the gateway 106. The gateway identification information may be the IP address or full hostname of the gateway 106. The session identifier allows the gateway 106 to link the subsequent streaming request to the initial progressive download request.

In some embodiments, where the initial progressive download request was an "HTTP get" message, the redirect message is an "HTTP redirect" message that includes an RTSP URL. The RTSP URL may contain the gateway identification information (e.g. IP address or hostname) and the session identifier.

In addition to receiving the response message from the web server 102, if the web server 102 is able to access the requested scalable media file, the control module 202 will also typically receive the scalable media file from the web server 102. The scalable media file is typically transmitted to the gateway control module 202 as a series of packets encapsulated using the first protocol or first protocol set (e.g. HTTP).

The buffer module 204, packet processor module 206, encapsulation module 212, and output module 216 work together to convert the received scalable media file into a media stream that is delivered to the media client 104.

The buffer module 204 receives the scalable media file from the control module 202 and temporarily stores the scalable media file. The buffer module 204 may be any type of memory device such as a RAM (Random Access Memory).

The packet processor module 206 reads the scalable media file from the buffer module 204 and parses the file into a plurality of raw media packets using well known techniques. The parsing will be based on the particular encoding standard used to encode the scalable media file. For example, where the scalable media file is an SVC video file, the scalable media file may be parsed into NAL (Network Abstraction Layer) packets.

The thinning module 208 receives the plurality of raw scalable media packets from the packet processor module 206 and performs thinning on the raw media packets to produce a plurality of thinned scalable media packets. Thinning is the process of intentionally removing specific packets from a scalable media stream. Thinning typically involves receiving a scalable media packet, analyzing the headers of the packet, and deciding to either drop the packet or forward it based on at least the information in the headers.

An SVC encoded video stream is organized into NAL (Network Abstraction Layer) units, and thinning an SVC encoded video stream typically involves analyzing the NAL unit header to determine what layer the packet belongs to.

Figure 3:
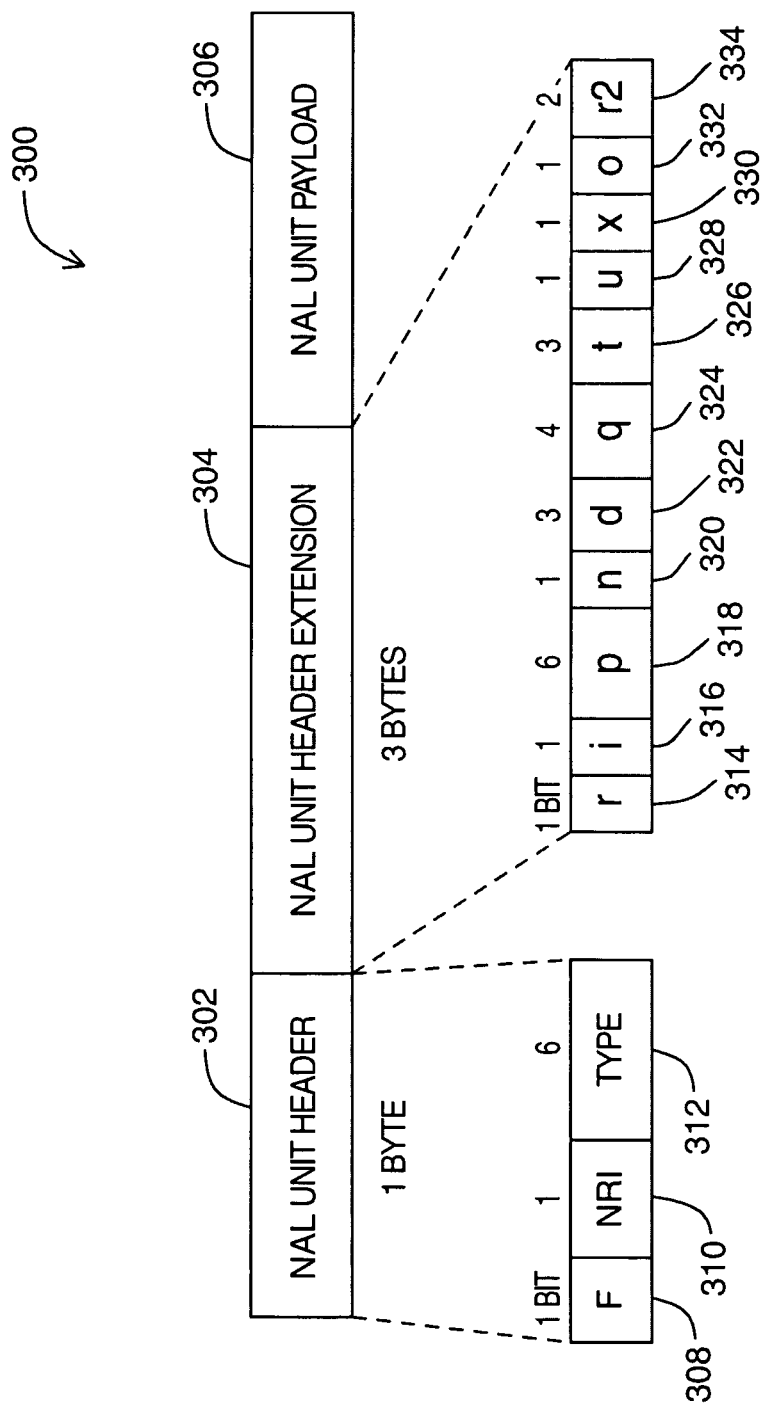
FIG. 3 is a block diagram of a NAL unit.

Reference is now made to FIG. 3, in which an SVC NAL unit 300 is illustrated. The SVC NAL unit 300 is divided into three segments, a one-byte NAL unit header 302, a three-byte SVC NAL unit header extension 304, and a variable length NAL unit payload 306.

The NAL unit header 302 is divided into three segments: a one-bit forbidden segment 308, a two bit NAL reference identification segment 310, and a five-bit NAL unit type segment 312. The forbidden segment 308 is typically set to 0. Setting the forbidden bit to 1 is declared a violation. The NAL reference identification segment 310 indicates whether NAL is required to maintain the reference picture. The NAL unit type 312 indicates the NAL type. Setting the NAL unit type 312 to 14, 15 or 20 indicates that the NAL unit is an SVC NAL unit.

The SVC NAL unit header extension 304 is divided into eleven segments: a one-bit first reserved segment 314, a one-bit instantaneous decoding refresh segment 316, a six-bit priority segment 318, a one-bit inter-layer prediction segment 320, a three-bit dependency segment 322, a four-bit quality segment 324, a three-bit temporal segment 326, a one bit use-base prediction flag segment 328, a one-bit discardable flag segment 330, a one-bit output flag segment 332, and two-bit second reserved segment 334.

The first and second reserve segments 314 and 334 have fixed values. For example, the second reserve segment 334 has a fixed value of 11. The instantaneous decoding refresh segment 316 identifies whether the layer representation is an instantaneous decoding refresh (IDR) layer. An IDR layer frame is a frame that does not depend on other frames to decode the entire frame. Setting the instantaneous decoding refresh segment 316 to 1 indicates it is an IDR layer and setting the instantaneous decoding refresh segment 316 to 0 indicates it is not an IDR layer. The priority segment 318 specifies the global priority of the NAL unit. A lower value indicates a higher priority. The inter-layer prediction segment 320 indicates whether another layer another layer (i.e. the base layer) must be used for decoding the current layer.

The dependency segment 322 indicates a layer with separate SPS (sequence parameter sets). It also indicates a spatial or CGS (coarse-grained scalability) layer. The quality segment 324 indicates the quality of the refinement layer. The temporal segment 326 indicates the temporal resolution. The use-base prediction flag segment 328 indicates use base representation of reference pictures for motion-compensated prediction. The discardable flag segment 330 is used to indicate that the NAL unit is not required for decoding higher layers. The output flag segment 332 specifies whether the decoded picture is output.

The NAL unit payload 306 contains the scalable media data.

Thinning an SVC encoded video stream typically involves analyzing the dependency, quality and temporal segments 322, 324, and 326 of the SVC NAL unit header extension 304. However, other fields may also be taken into account.

Referring back to FIG. 2, the method of selecting which packets of an SVC encoded video stream to drop and which to forward is quite complex and takes into account a number of parameters. The method can be explained at a basic level as follows. The layers of the video stream define a three-dimensional matrix of temporal scaling, resolution scaling and quality (SNR) scaling. The goal of the thinning process is to determine the appropriate operational spot (i.e. the resolution, frame rate, and quality level) on the matrix for a particular media client 104 and remove or drop packets representing layers above the operational spot.

Thinning allows scalable media streams to be tailored to the media client 104 by delivering scalable media streams with different resolutions, frame rates and quality to different media clients 104. Thinning has the effect of changing the bandwidth requirements of a media stream. As a result, thinning can be used to either adjust to a decrease in available bandwidth, or take advantage of an increase in available bandwidth.

There are generally two types of thinning that can be performed: steady state thinning and dynamic thinning. Steady state thinning is the process of thinning a scalable media stream to meet the requirements of a media session during a steady state. Steady state thinning typically involves thinning the scalable media stream to achieve the steady state operational spot (i.e. the resolution, frame rate and quality level) on the three-dimensional matrix.

The steady state operational spot may be selected based on the initial bandwidth between the gateway 106 and the media client 104; the resolution, frame rate and quality level requested by the media client 104; the profile of the media client 104; and defined policies.

In some cases, the gateway 106 may be able to determine the available bandwidth between the media client 104 and the gateway 106 before the media session starts. Specifically, some media clients 104 support proprietary protocols to assist in determining the start-up bandwidth. For example, many Microsoft™ media clients 104 support the concept of sending a well-defined "Packet-Pair" to the media client 104 before it receives the scalable media stream (e.g. scalable video stream). By leveraging well-known information about those packets, the media client 104 can estimate the receiving bandwidth. Similarly, Adobe™ has implemented an Action Script service that provides for a similar model of determining the bandwidth before streaming the scalable media stream.

These mechanisms may be used as input to the initial session setup messages exchanged between the gateway 106 and the media client 104. For example, the initial setup may involve an RTSP/SDP (Session Description Protocol) exchange between the gateway 106 and the media client 104. In other cases, these mechanisms may provide means to present this information directly to the gateway 106.

Alternatively, the gateway 106 may start off by sending the media client 104 the highest quality scalable media stream, and reducing the quality as it learns about the bandwidth between the gateway 106 and the media client 104. For example, once streaming has started there are well-known network feedback mechanisms that can help determine the bandwidth between the gateway 106 and the media client 104.

Typically, the media client 104 will specify the resolution, frame rate and quality level it wishes to receive during the initial setup of the media session. For example, where the scalable media stream is streamed using the RTSP/RTP protocols, the information for the layers is provided to the media client 104 in advance of the scalable media stream. Specifically, the media client 104 will send an initial RTSP Describe message to the gateway 106, and as part of the response, the gateway 106 will provide the media client 104 with an RTSP/SDP message that defines the parameters for each layer. The media client 102 then has the opportunity to specify which layers it wishes to receive.

In addition, during the initial session setup, the gateway 106 may acquire information about the media client 104 system limitations that may affect its ability to receive or display scalable media streams. For example, an RTSP Describe message typically includes a "user agent" field that may contain information on the media player and operating system being used by the media client 104. This information can be used to determine the capabilities of the media client 104 which can in turn be used to determine the steady state operational spot.

The steady state operational spot may also be selected based on predefined policies. The policies may control, for example, one or more of the following: the maximum quality, the maximum number of concurrent sessions, the maximum session bandwidth, the maximum frame rate, and the maximum resolution. The maximum quality would typically be based on the combination of temporal, spatial and quality scalable levels. The maximum number of current sessions would typically control the maximum number of concurrent scalable media sessions handled by the gateway 106. The maximum session bandwidth would typically specify the maximum bandwidth to be allotted to a particular session.

In some embodiments, the policies are configured and managed on the gateway 106 (i.e. dynamic policy management module 210). In other embodiments, the policies are configured and managed by an external policy management server (not shown), such as a COPS (Common Open Policy Service) server, a RADIUS (Remote Authentication Dial-In User Service) server, or an ICAP (Internet Content Adaptation Protocol) server.

In some cases, a change in the steady state operational spot may be triggered by the client making a change to their configuration. For example, the client may request a change in the resolution or frame rate of a video stream.

In other cases, a change in the steady state operational spot on the matrix may be triggered by an external policy or by an administrator. For example, a user might initially receive a scalable media stream in low quality, but after completing a registration or paying for a service, may be able to receive the remainder of the scalable media stream in high quality.

Dynamic thinning is thinning that (i) adjusts for dynamically changing aspects of a media session (i.e. the network conditions); or (ii) is applied to a group of streams collectively. Dynamic thinning can generally be described as the process of receiving feedback from internal sources (i.e. the gateway 106 itself) and external sources (i.e. the network) and temporarily adjusting the operational spot to match the current conditions.

Dynamic thinning typically includes thinning that is based on the current network conditions between the gateway 106 and the media client 104. For example, the gateway 106 may monitor the current network conditions through mechanisms such as RTCP (RTP Control Protocol) and adjust the thinning to take advantage of increases or decreases in bandwidth between the gateway 106 and the media client 104.

As defined in RFC 3550, an RTP media client 104 will typically provide periodic reports through RTCP. RTCP provides parameters that assist in determining the current network conditions between the gateway 106 and the media client 104. For example, an RTCP RR (Receiver Report) includes information on packet loss and inter-arrival jitter. In cases where the gateway 106 monitors the network conditions through RTCP, the gateway 106 may be configurable to set, for example, how often the gateway 106 expects to receive a receiver report (RR) message and/or what percentage of bandwidth between the gateway 106 and the media client 104 can be used for RR messages.

Other RTCP mechanisms that may be leveraged by the gateway 106 include RTCP extended reports and Next Application Data Units. RTCP extended reports typically include more information than the base RTCP packets. Particularly, they may provide more information on packet loss and delays. Next Application Data units provide information to determine the status of the buffer on the media client 104.

Dynamic thinning may also include thinning that is based on the current condition of the gateway 106 itself. For example, the stream management node 106 may have mechanisms to monitor the performance of the gateway 106 and adjust the thinning to all or groups of scalable media streams. For example, by monitoring the depth of outbound queues the gateway 106 can anticipate that it may run into situations where it may have to drop packets. Rather than simply dropping random packets from the queue, the gateway 106 can implement a change to the thinning process on the affected streams to ensure the queue is never full.

Dynamic thinning also typically includes thinning that is based on policies that are applied to groups of sessions. For example, the gateway 106 may apply a policy that limits the bandwidth applied to a group of sessions. As described above, in some embodiments, the policies may be configured and managed on the gateway 106 itself (e.g. by the dynamic policy management module 210). In such embodiments, group-based policies may be implemented on a media stream URL basis. In other embodiments, the policies are configured and managed by an external policy server, such as a COPS server, a RADIUS server, or an ICAP server.

The encapsulation module 212 receives the plurality of thinned scalable media packets from the thinning module 208, and encapsulates the thinned media packets to produce a plurality of encapsulated scalable media packets. In some embodiments, the thinned scalable media packets are encapsulated into RTP packets.

The policing module 214 receives the plurality of encapsulated scalable media packets from the encapsulation module 212, and performs policing on the plurality of encapsulated media packets to produce a plurality of policed packets. Policing can be described as the monitoring and management of the packets of a media stream to ensure the highest quality of experience (QoE). This typically involves taking advantage of layer knowledge to prioritize packets to ensure potentially dropped packets minimize the impact to QoE. Specifically, the different layers of an SVC-encoded video stream may have different priorities and the policing module 214 may use that information in determining which packets to drop.

Stream policing may include the use of techniques such as rate shaping, quality of service (QoS), and forward error correction (FEC) control. Rate shaping throttles the rate at which packets are transmitted. In some embodiments, the policing module 214 may be configured with a high-water mark bandwidth, such that if the amount of bandwidth being used for the scalable media stream(s) exceeds this high-water mark, the policing module 214 may reduce each stream by a predetermined percentage through thinning or it may stop accepting new requests. For example, a bandwidth of 1 Gbps may be assigned for all scalable media streams associated with a particular URL. When the bandwidth used for scalable media streams associated with this URL exceeds 1 Gbps, the policing module 214 may either throttle back each of the existing scalable media streams or it may not accept any more requests for scalable media streams associated with that URL.

Forward error correction is way of obtaining error control in data transmissions where the sender adds error correction code (e.g. redundant data) to each message. This allows the receiver to detect and correct errors without the need for additional information from the sender. In some embodiments, the policing module 214 may automatically implement FEC based on the network conditions (i.e. available bandwidth) and/or preconfigured policies. For example, FEC may be automatically implemented when the policing module 214 detects packet loss in the network. FEC may be applied to some or all of the layers of a scalable media stream. For example, FEC may initially be applied to the base layer only and subsequently applied to additional layers as required.

Quality of service refers to the ability to provide different priority to different packets based on predetermined criteria. For example, in a typical network, packets relating to a real-time service, such as voice or video, may be given a higher priority than data packets. In an IP network that supports QoS, packets may include an IP QoS tag that indicates the priority to be given to that packet. The IP QoS tag may be assigned and processed in accordance with a standard protocol such as TOS (type of service) or DSCP (Differentiated Services Code Points). In some embodiments, the policing module 214 may process a received packet in accordance with its IP QoS tag. In other embodiments, the policing module 214 may have the ability to retag packets based on predefined policies.

The output module 216 receives the plurality of policed media packets and streams them to the media client 104.

Figure 4:
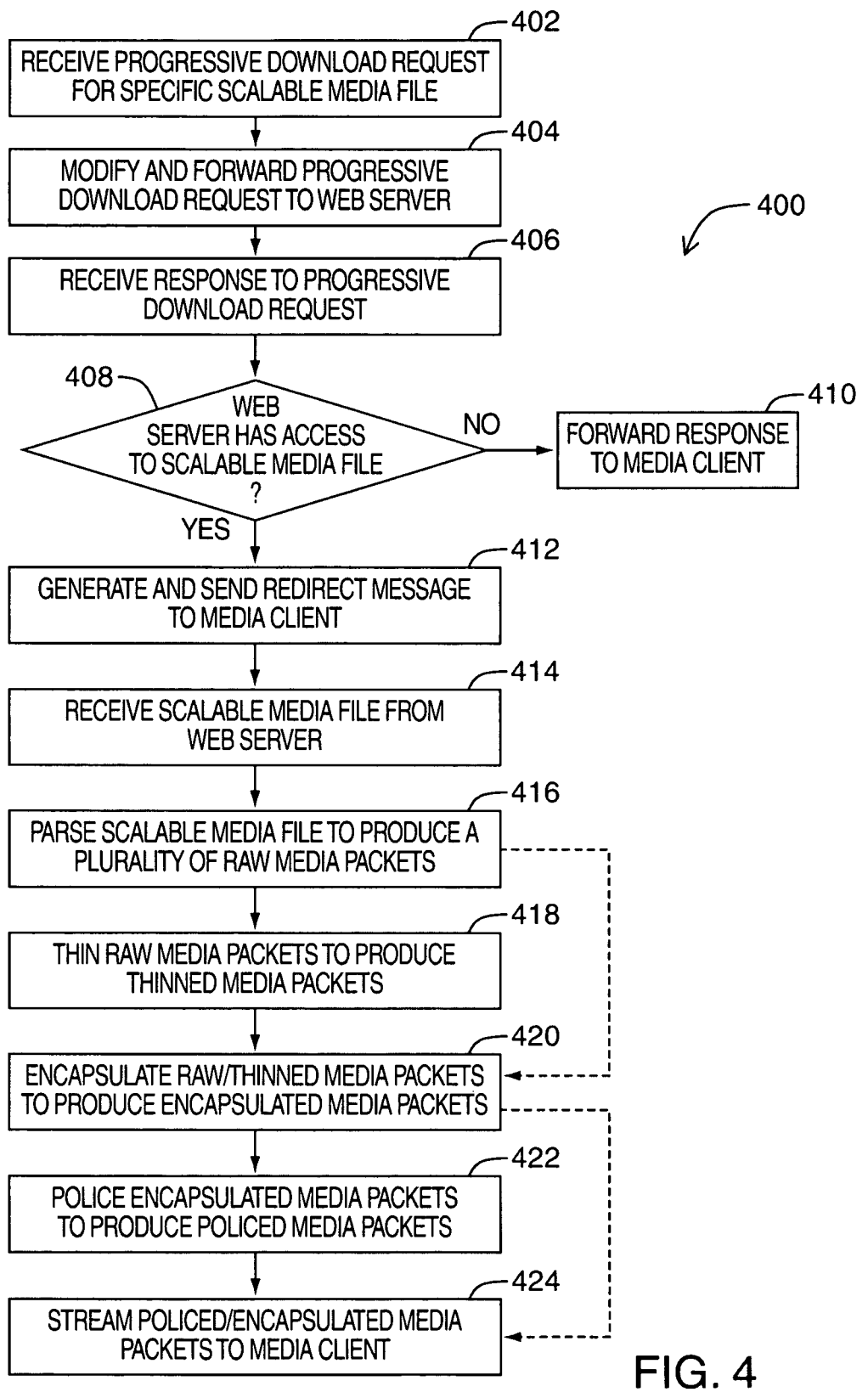
FIG. 4 is a flowchart of a method for delivering a scalable media file from a web server to a media client in accordance with at least one embodiment.

Reference is now made to FIG. 4 in which a method 400 for delivering a scalable media file from a web server (i.e. web server 102) to a media client (i.e. media client 104) in accordance with an embodiment is illustrated. At (402), a gateway (i.e. gateway 106) receives a progressive download request from a media client (i.e. media client 104) for a particular scalable media file. The progressive download request typically includes scalable media file identification information that identifies the desired scalable media file. In some cases, the progressive download request is an "HTTP get" request that includes the URL of the desired scalable media file. Upon receiving a progressive download request, the method proceeds to (404).

At (404), the gateway (i.e. gateway 106) modifies the progressive download request and forwards the modified progressive download request to the appropriate web server (i.e. web server 102). Typically, the gateway only modifies the portions of the request that identify the media client as the source or requester. For example, where the initial request is an "HTTP get" request, the gateway will modify the source IP address and the source port fields to reflect the IP address and port of the gateway. These modifications ensure that any response generated by the web server will be sent back to the gateway instead of to the media client.

Determining the appropriate web server typically involves parsing the progressive download request to determine the scalable media file identification information (i.e. the URL of the scalable media file) and then determining the address (e.g. IP address) of the appropriate web server based on the scalable media file identification information. This may include performing a DNS (Domain Name System) lookup of the scalable media file URL.

In some embodiments, the gateway also creates a session record which stores information about the session between the gateway and the media client. The session record may include client identification information (i.e. the IP address and/or host name of the media client 104), and a session identifier. As described above in reference to FIG. 2, the session identifier is used to uniquely identify the request from the media client. Once the progressive download request has been forwarded to the media server, the method 400 proceeds to (406).

At (406), the gateway (i.e. gateway 106) receives a response message from the web server (i.e. web server 102). Where the progressive download request is an "HTTP get" message, the response message may be an "HTTP ok" message or an "HTTP not found message." After receiving the response message the method proceeds to (408).

At (408), the gateway (i.e. gateway 106) determines whether the response indicates that the web server has access to the requested scalable media file. For example, an "HTTP ok" message typically indicates that the web server has located the requested scalable media file, whereas an "HTTP not found" message typically indicates that the web server is unable to find the requested scaleable media file. If the response indicates that the web server does not have access to the requested scalable media file, the method proceeds to (410). If the response indicates that the web server has access to the requested scalable media file, the method proceeds to (412).

At (410), the gateway forwards the response to the media client and deletes the associated session record. The method 400 then ends here.

At (412), the gateway generates a redirect message and forwards the redirect message to the media client (i.e. media client 104). The redirect message tells the media client (i.e. media client 104) to change their request from a first protocol progressive download request, to a second protocol streaming request. For example, the media client may have sent an initial HTTP progressive download request. The redirect message may tell the client to change their request to an RTSP streaming request.

The redirect message typically includes (i) gateway identification information; and (ii) the session identifier described above. The gateway identification information uniquely identifies the gateway to allow the media client to send the streaming request directly to the gateway. The gateway identification information may be the IP address or full hostname of the gateway. The session identifier allows the gateway to link the subsequent streaming request to the initial progressive download request.

In some embodiments, where the initial progressive download request is an "HTTP get" message, the redirect message may be a HTTP redirect message that includes a RTSP URL. The RTSP URL may contain the gateway identification information (e.g. IP address or hostname) and the session identifier. Once the gateway has sent the redirect message to the media client, the method 400 proceeds to (414).

At (414), the gateway receives the requested scalable media file from the web server. The scalable media file is typically transmitted to the gateway as a series of packets encapsulated in the first protocol or first protocol set (e.g.

HTTP). The gateway typically buffers the received packets in a buffer module (i.e. buffer module 202). The method 400 then proceeds to (416).

At (416), the gateway parses the scalable media file into a plurality of raw scalable media packets The parsing will be based on the particular encoding standard used to encode the scalable media file. For example, where the scalable media file is an SVC encoded video file, the scalable media file may be parsed into NAL packets as set out in RFC 3984. The packetization may be performed by a packet processor module (i.e. packet processor module 206). After the scalable media file has been packetized, the method may either proceed to (418) or (420). If the plurality of raw scalable media packets are to be thinned prior to encapsulation, then the method 400 proceeds to (418), otherwise the method 400 proceeds to (420).

At (418), the gateway (i.e. gateway 106) performs thinning on the plurality of raw scalable media packets to produce a plurality of thinned scalable media packets. As described above, with reference to FIG. 2, thinning is the process of intentionally removing specific packets from a scalable media stream. Thinning typically involves receiving a scalable media packet, analyzing the headers of the packet, and deciding to either drop the packet or forward it based on at least the information in the headers. Thinning was described in detail in reference to FIG. 2. The thinning may be performed by a thinning module (i.e. thinning module 208). After the thinning process, the method 400 proceeds to (420).

At (420), the gateway (i.e. gateway 106) receives a plurality of processed scalable media packets and encapsulates the received packets to produce a plurality of encapsulated scalable media packets. The processed scalable media packets are either the thinned scalable media packets generated at (418) or the plurality of raw scalable media packets generated at (416). In either case, the processed scalable media packets are at least a portion of the raw scalable media packets.

In some embodiments, the processed scalable media packets are encapsulated into RTP packets. The encapsulation may be performed by an encapsulation module (i.e. encapsulation module 212). After encapsulation, the method 400 proceeds to either (422) or (424). If the encapsulated scalable media packets are to be policed prior to transmission to the media client (i.e. media client 104), the method 400 proceeds to (422). Otherwise, the method 400 proceeds to (424).

At (422), the gateway (i.e. gateway 106) performs policing on the plurality of encapsulated scalable packets to produce a plurality of policed scalable packets. Policing can be described as the monitoring and management of the packets of a media stream to ensure the highest quality of experience (QoE). This typically involves taking advantage of layer knowledge to prioritize packets to ensure potentially dropped packets minimize the impact to QoE. Specifically, the different layers of an SVC-encoded video stream may have different priorities and the gateway may use that information in determining which packets to drop. Policing was described in detail in reference to FIG. 2.

The policing may be performed by a policing module (i.e. policing module 214). After policing, the method proceeds to (424).

At (424), the gateway (i.e. gateway 106) receives a plurality of output scalable media packets and streams the received packets to the media client (i.e. media client 104). The plurality of output scalable media packets are either the plurality of policed scalable packets generated at (422), or the plurality of encapsulated scalable packets generated at (420). In either case, the plurality of output scalable media packets are at least a portion of the plurality of encapsulated scalable packets generated at (420).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A gateway device for delivering a scalable media file from a web server to a media client over a network, the gateway device comprising:
 (a) a control module for:
  (i) receiving, using a first protocol, a progressive download request from the media client for the scalable media file;
  (ii) forwarding the request to the web server;
  (iii) receiving the scalable media file from the web server in response to the progressive download request, the scalable media file being encapsulated using the first protocol;
  (iv) transmitting an HTTP redirect message to the media client, wherein the HTTP redirect message instructs the media client to replace the progressive download request for the scalable media file with a streaming request for the scalable media file addressed to the gateway device; and
  (v) receiving, using a second protocol, the streaming request from the media client in response to the HTTP redirect message; and
 (b) a buffer module for storing the scalable media file;
 (c) a packet processor module for reading the scalable media file from the buffer module and packetizing the scalable media file to produce a plurality of raw scalable media packets;
 (d) an encapsulation module for encapsulating a plurality of processed scalable media packets using the second protocol to produce a plurality of encapsulated scalable media packets, the plurality of processed scalable media packets being at least a portion of the plurality of raw scalable media packets; and
 (e) an output module for streaming a plurality of output scalable media packets to the media client using the second protocol, in response to the streaming request, the output scalable media packets being at least a portion of the plurality of encapsulated scalable media packets.

2. The gateway device of claim 1, further comprising a thinning module for thinning the plurality of raw scalable media packets to produce the plurality of processed scalable media packets.

3. The gateway device of claim 2, wherein the thinning includes dynamic thinning.

4. The gateway device of claim 3, wherein dynamic thinning comprises thinning performed in response to dynamic feedback received from at least one of the gateway device, the media client and the network.

5. The gateway device of claim 4, wherein the dynamic feedback indicates available network bandwidth between the gateway device and the media client.

6. The gateway device of claim 5, wherein the dynamic feedback comprises at least one RTCP message.

7. The gateway device of claim 2, wherein the thinning includes steady state thinning.

8. The gateway device of claim 7, wherein steady state thinning comprises thinning performed to achieve a steady state operational point, the steady state operational point defining a resolution, frame rate and quality level for the scalable media file.

9. The gateway device of claim 8, wherein the steady state operational point is based on at least one of
   an initial available network bandwidth between the gateway device and the media client;
   a resolution, frame rate and quality level specified by the media client;
   a profile of the media client; and
   a defined set of policies.

10. The gateway device of claim 2, wherein the gateway device further comprises a dynamic policy management module for defining a set of policies, and the thinning module performs the thinning in accordance with the set of policies.

11. The gateway device of claim 1, further comprising a policing module for performing policing on the plurality of encapsulated scalable media packets to produce the plurality of output scalable media packets.

12. The gateway device of claim 11, wherein policing comprises at least one of rate shaping, quality of service, and forward error correction.

13. The gateway device of claim 1, wherein the first protocol is HTTP, and the second protocol is RTSP/RTP.

14. The gateway device of claim 1, wherein the HTTP redirect message comprises address information for the gateway device and a session identifier, and the streaming request comprises the session identifier.

15. The gateway device of claim 14, wherein the session identifier provides a link between the progressive download request and the streaming request.

16. The gateway device of claim 1, wherein the plurality of raw scalable media packets are network abstraction layer packets.

17. The gateway device of claim 1, wherein the scalable media file is a scalable video coding file.

18. A method for delivering a scalable media file from a web server to a media client over a network, the method comprising, at a gateway device:
   (a) receiving, using a first protocol, a progressive download request from the media client for the scalable media file;
   (b) forwarding the request to the web server;
   (c) receiving the scalable media file from the web server in response to the progressive download request, the scalable media file being encapsulated using the first protocol;
   (d) transmitting an HTTP redirect message to the media client, wherein the HTTP redirect message instructs the media client to replace the progressive download request for the scalable media file with a streaming request for the scalable media file addressed to the gateway device;
   (e) performing packetization on the scalable media file to produce a plurality of raw media packets;
   (f) encapsulating a plurality of processed scalable media packets using a second protocol to produce a plurality of encapsulated scalable media packets, the processed media packets comprising at least a portion of the raw scalable media packets; and
   (g) streaming, using the second protocol, a plurality of output scalable media packets to the media client in response to the streaming request from the media client, the output scalable media packets being at least a portion of the plurality of encapsulated scalable media packets.

19. The method of claim 18, further comprising thinning the plurality of raw scalable media packets to produce the plurality of processed scalable media packets.

20. The method of claim 19, wherein thinning includes dynamic thinning.

21. The method of claim 20, wherein dynamic thinning comprises thinning performed in response to dynamic feedback received from at least one of the gateway, the media client and the network.

22. The method of claim 21, wherein the dynamic feedback indicates available network bandwidth between the gateway and the media client.

23. The method of claim 22, wherein the dynamic feedback comprises at least one RTCP message.

24. The method of claim 19, wherein thinning includes steady state thinning.

25. The method of claim 24, wherein steady state thinning comprises thinning performed to achieve a steady state operational point, the steady state operational point defining a resolution, frame rate and quality level for the scalable media file.

26. The method of claim 25, wherein the steady state operational point is based on at least one of
   an initial available network bandwidth between the gateway and the media client;
   a resolution, frame rate and quality level specified by the media client;
   a profile of the media client; and
   a defined set of policies.

27. The method of claim 19, wherein the thinning is performed in accordance with a set of dynamic policies.

28. The method of claim 18, further comprising performing policing on the plurality of encapsulated scalable media packets to produce the plurality of output scalable media packets.

29. The method of claim 28, wherein policing comprises at least one of rate shaping, quality of service, and forward error correction.

30. The method of claim 18, wherein the first protocol is HTTP and the second protocol is RTSP/RTP.

31. The method of claim 18, wherein the HTTP redirect message comprises address information for a gateway and a session identifier, and the streaming request comprises the session identifier.

32. The method of claim 31, wherein the session identifier provides a link between the progressive download request and the streaming request.

33. The method of claim 18, wherein the plurality of raw scalable media packets are network abstraction layer packets.

34. The method of claim 18, wherein the scalable media file is a scalable video coding file.

* * * * *